United States Patent
Roy

(10) Patent No.: US 7,388,929 B2
(45) Date of Patent: Jun. 17, 2008

(54) METHOD AND APPARATUS FOR PROVIDING SERVICE AVAILABILITY INFORMATION IN A WIRELESS COMMUNICATION SYSTEM

(75) Inventor: Vincent Roy, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 599 days.

(21) Appl. No.: 10/901,810

(22) Filed: Jul. 29, 2004

(65) Prior Publication Data

US 2006/0025115 A1  Feb. 2, 2006

(51) Int. Cl.
H04K 1/02  (2006.01)
(52) U.S. Cl. .................. 375/297; 375/259; 455/67.11; 455/517; 455/435.2; 702/182
(58) Field of Classification Search .............. 375/297, 375/259; 455/67.11, 517
See application file for complete search history.

(56) References Cited

U.S. PATENT DOCUMENTS

| 5,613,213 A | * | 3/1997 | Naddell et al. ............ 455/435.2 |
| 6,137,824 A | * | 10/2000 | Liu .............................. 375/130 |
| 6,353,598 B1 | | 3/2002 | Baden et al. |
| 6,600,903 B1 | * | 7/2003 | Lilja et al. ............... 455/67.11 |

* cited by examiner

*Primary Examiner*—Mohammed Ghayour
*Assistant Examiner*—Juan Alberto Torres
(74) *Attorney, Agent, or Firm*—Volpe and Koenig, P.C.

(57) ABSTRACT

The present invention is related to a method and apparatus for providing service availability information to a user in a wireless communication system. After receiving a beacon signal from a base station, a WTRU measures a power level and an interference level of the beacon signal. A target SIR and a power offset for each service is pre-defined and stored in a memory of the WTRU. A processor calculates an estimated SIR for each service, and generates a service availability indicator by dividing the estimated SIR with a target SIR for each service. A user is informed of the availability of various services simply by looking at the display of the WTRU.

15 Claims, 2 Drawing Sheets

METHOD AND APPARATUS FOR PROVIDING SERVICE AVAILABILITY INFORMATION IN A WIRELESS COMMUNICATION SYSTEM

FIELD OF INVENTION

The present invention is related to a communication system. More particularly, the present invention is related to a method and apparatus for providing service availability information to a user in a wireless communication system.

BACKGROUND

A wireless communication system includes at least one base station and a plurality of wireless transmit/receive units (WTRUs). FIG. 1 shows a schematic diagram of a conventional base station 10 and WTRU 20. A base station 10 provides numerous services to a WTRU 20 via a wireless connection. The services include voice communication services, packet data services, paging services, and audio and video services. The particular services available at a particular base station are typically specified in the base station's beacon signal. The various services often differ widely in required bit rates, allowable delays, and tolerable error rates, etc. The quality of each service is dependent on different factors depending on the nature of the services. These service-dependent factors have an impact on the signal strength requirements that are needed to satisfy the associated quality of service (QoS) requirements. For example, a low bit-rate packet-switched connection used for web browsing on a personal data assistant (PDA) requires much less signal strength than a high bit-rate circuit-switched connection used for a video conference. This means that a user may not be able to receive certain services in a certain location. A user in a given location might be unable to use certain services which require more signal strength, while less demanding services could still be provided to the user.

A WTRU is normally configured to display the level of power of a signal received from a base station using a bar graph as illustrated in FIG. 2. The display is normally related to the highest power level of a signal received from a beacon channel from the nearest base station. This diagram indicates the quality of a connection between a WTRU and a base station. However, a user cannot estimate from this diagram whether a particular service may or may not be supported with a minimum QoS until the user actually tries to establish a connection for a particular service. If the service is not supported at the location, such blind attempts at establishing connections are a waste of time for the user, and impose unnecessary signaling traffic on the radio network.

It would therefore be desirable to provide service availability information to users in wireless communication systems.

SUMMARY

The present invention provides service availability indicators for services potentially available to wireless transmit/receive units (WTRUs). The service availability indicators are displayed on a WTRU. The present invention provides an indication of which services are available in a particular location, even before the user attempts to establish any connection. The present invention limits the number of unsuccessful call establishment attempts from the user which result in a waste of time for the user. The invention also relieves communication networks from interference and unnecessary signaling associated with unsuccessful connection attempts.

BRIEF DESCRIPTION OF THE DRAWING(S)

DETAILED DESCRIPTION OF THE PREFERRED EMBODIMENT(S)

Figure 1:
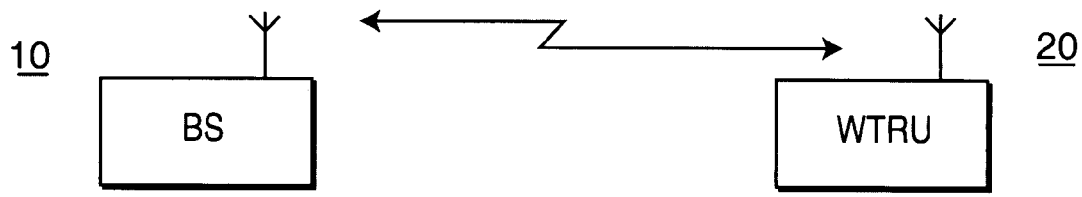
FIG. 1 is a schematic diagram of a conventional base station and WTRU.
Figure 2:
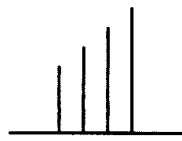
FIG. 2 is a diagram of a signal strength indicator in accordance with prior art.

The present invention will be described with reference to the drawing figures wherein like numerals represent like elements throughout. Herein, a wireless transmit/receive unit (WTRU) includes but is not limited to a user equipment, mobile station, fixed or mobile subscriber unit, pager, or any other type of device capable of operating in a wireless environment. When referred to herein, a base station includes but is not limited to a Node-B, site controller, access point or any other type of interfacing device in a wireless environment.

Figure 3:
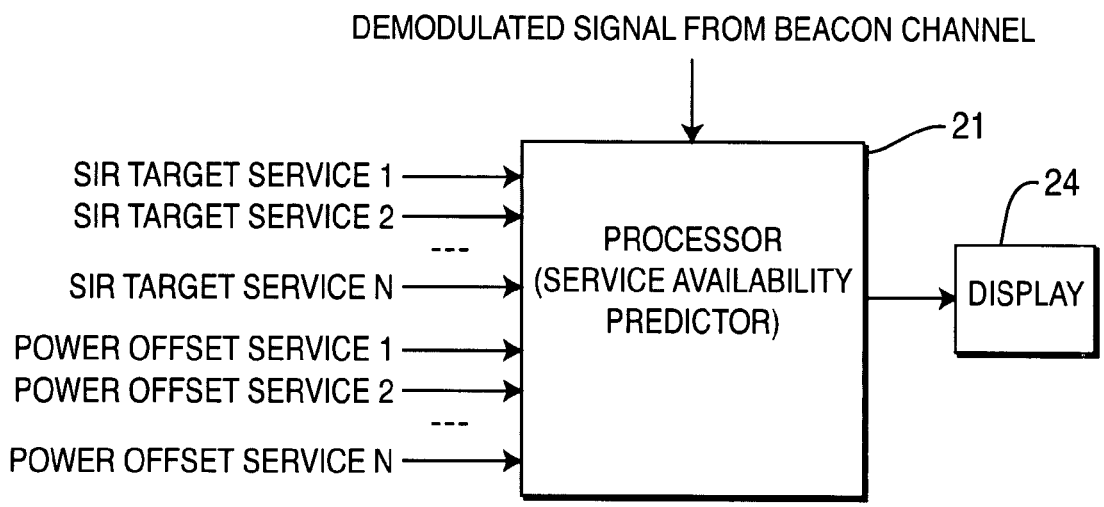
FIG. 3 is a diagram showing a flow of data inputs and outputs in a WTRU in accordance with the present invention.

FIG. 3 generally shows a flow of data input to and output from a WTRU in accordance with the present invention. A demodulated signal from a beacon channel is input to a processor 21 of a WTRU. In a preferred embodiment, the WTRU is informed of what services 1-N are potentially available at its present location from the demodulated beacon signal. In another embodiment, the services that are potentially available may be pre-configured in the WTRU or signaled to it over a channel other than the beacon channel.

Signal-to-interference ratio (SIR) targets for services 1-N and power offsets for services 1-N are also input to the processor 21. The SIR targets and power offsets are preferably input from a memory within the WTRU, but may be signaled or otherwise provided to the WTRU in any manner. As explained in detail below, based on these inputs, the processor 21 generates and outputs a service availability indicator to a display 24 of a WTRU for each potentially available service thereby providing service availability information to a user.

Figure 4:
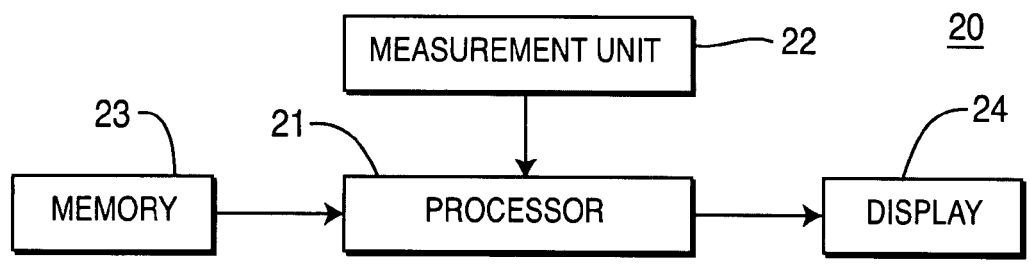
FIG. 4 is a diagram of a WTRU in accordance with the present invention.

Referring now to FIG. 4, a diagram of a WTRU 20 in accordance with the present invention is shown. The WTRU 20 preferably includes a processor 21, a measurement unit 22, a memory 23, and a display 24. It is noted that the WTRU 20 is configured to receive wireless signals in accordance with conventional methods and thus for simplicity in describing the present invention the WTRU's 20 receiving unit is not shown.

The WTRU 20 receives a beacon signal from a base station wherein the WTRU 20 is operating within a wireless coverage area provided by the base station. As understood by those skilled in the art, the beacon signal is broadcast to all WTRUs operating within the coverage area provided by the base station. A measuring unit 22 receives the beacon signal and measures a power level and an interference level of the beacon signal received from the base station. A beacon signal is preferably used because it is transmitted at a relatively high power level and is available to all WTRUs all the time in a coverage area provided by the base station. However, a beacon signal is provided by way of example and any other signal, whether or not it is a control signal or a traffic signal, transmitted from the base station to the WTRU may be utilized for implementing the present invention. Measurement of the power level and the interference level is conducted by conventional methods, and the details of such procedures are not described herein.

The WTRU 20 is configured to receive a plurality of services from a base station. The services potentially available to a WTRU 20 are identified in a beacon signal broadcast by the base station within whose coverage area the WTRU 20 is operating. Each service has different factors depending on the nature of the service. A target signal-to-interference ratio (SIR) for each potentially available service is pre-determined and stored in a memory 23 of the WTRU 20. For example, in wideband code division multiple access (WCDMA), each radio access bearer, which can be mapped to service classes, has a pre-defined SIR target to initialize an inner loop power control. Target SIRs may also be signaled or otherwise transmitted from a base station to a WTRU 20 so that the WTRU 20 may update/add the target SIRs in/to memory, as needed. To provide users with service availability information, the target SIRs are compared with estimated SIRs which are based on actual conditions, as explained below.

To compute an estimated SIR for each service potentially available via a particular base station, power offsets are used in combination with the power level at which a base station's beacon is received at the WTRU 20. Power offsets, similar to the target SIRs, are pre-defined for each potentially available service. A power offset is a ratio of the highest power a base station may dedicate to a particular service over the power at which the base station transmits it beacon. For example, where a base station dedicates 1 W to voice communications and the base station transmits its beacon at 2 W, the power offset for the base station's voice communication service is 1 W/2 W or 0.5. The power offsets are radio network parameters that may be signaled or otherwise transmitted to WTRUs operating within the base station's coverage area. The power offsets for a plurality of base stations may also be pre-configured in a WTRU 20. For example, a WTRU 20 configured to operate within a particular wireless system may be configured so that power offsets and target SIRs are stored in memory 23 for each base station in the wireless system. In this arrangement, when a WTRU 20 is operating within a coverage area of a particular base station, the WTRU 20 may simply obtain from memory 23 the power offsets and target SIRs corresponding to that base station. Regardless of how the WTRU 20 obtains the parameters, they are preferably stored in a memory 23 of the WTRU 20.

To calculate the estimated SIRs, a processor 21 first obtains a power offset for each potentially available service from memory 23 as well as the power level at which the base station's beacon is received at the WTRU 20 from measurement unit 22. The processor 21 then calculates an expected maximum power for each service by multiplying the power level at which the beacon signal is being received at the WTRU 20 with each of the power offsets. Then, to obtain the actual estimated SIR, the processor 21 divides the expected maximum power of each service by the interference level of the received beacon.

The estimated SIR is preferably calculated at the carrier-level and, depending on the air interface used by the system in which the WTRU 20 is operating, a transform of the carrier-level SIR estimates into symbol-based SIR estimates may be needed. For example, in CDMA-based systems, this is typically done by multiplying carrier-level SIR values by a factor proportional to the spreading factor used by a specific service.

In a first embodiment, the processor 21 calculates a service availability indicator for each service by dividing the estimated SIR by the target SIR for each service. A processor 21 outputs the service availability indicator for each service to a display 24. A low service availability indicator value indicates that there is little chance the user will be able to use the service with a satisfactory quality of service (QoS). On the other hand, a high service availability indicator value indicates that the user is more likely to be able to use the service with a satisfactory QoS. Therefore, in this embodiment, a user may anticipate the possibility of a successful connection for each service at a particular location by viewing service availability indicator values without actually attempting to establish a connection.

In a preferred embodiment, however, the processor 21 compares the service availability indicators to pre-determined thresholds and specifically identifies which services are and are not available. A threshold is pre-determined by a system operator, and stored in a memory 23 of the WTRU. The processor 21 reads the threshold for each service, and compares it with a calculated service availability indicator for each service. If the service availability indicator is greater than a threshold, the processor 21 generates an output indicating that the service is available, and if the service availability indicator is not greater than a threshold, the processor 21 generates an output indicating that the service is not available. This embodiment allows a user to determine, simply by glancing at the display 24 of the WTRU 20, which services are and are not available at the WTRU's 20 current location.

Figure 5:
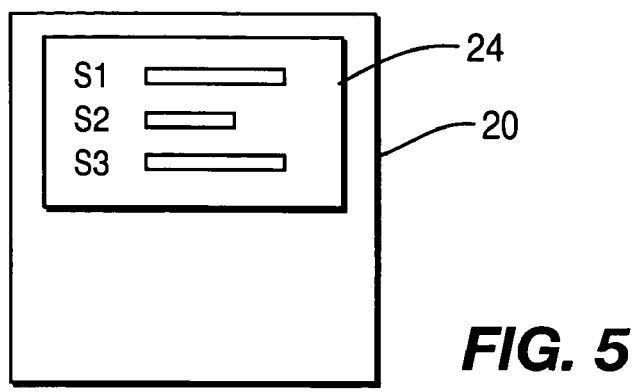
FIG. 5 is a diagram of a WTRU having a display for displaying service availability in accordance with the present invention.

Purely by way of example, a sample display 24 is illustrated in FIG. 5. In the illustrated display, assume services S1 and S3 are available and therefore may be illuminated using a green light. Further assume that service S2 is not available and therefore may be illuminated using a red light. Again, this example is provided by way of example as any type of graphical representations and/or color schemes may be used in the display 24.

Figure 6:
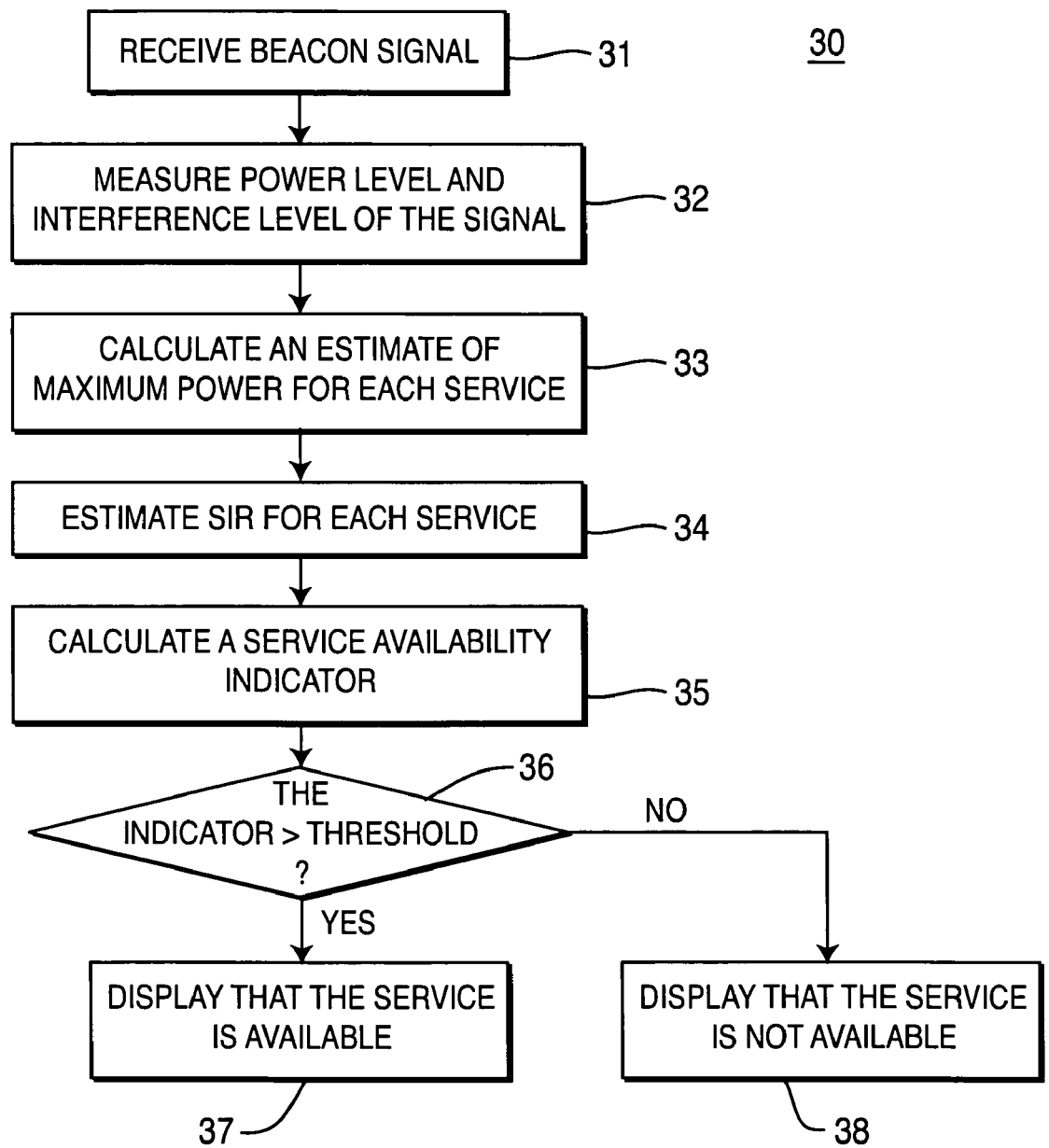
FIG. 6 is a flow diagram of a procedure for displaying service availability on a display of a WTRU in accordance with the present invention.

FIG. 6 shows a procedure 30 for displaying service availability information on a display of a WTRU in accordance with the present invention. A WTRU receives a beacon signal from a base station (step 31). As explained above, the beacon signal is broadcast to all WTRUs in a coverage area provided by the base station. A measurement unit of the WTRU measures a power level and an interference level of the received beacon signal (step 32).

A target SIR and a power offset for each service is pre-defined and stored in a memory of the WTRU, as explained above. A processor obtains the power offset for each service preferably from the memory and measures the power at which it is receiving the beacon signal. Based on these items, the WTRU estimates the expected maximum power of each service by multiplying the received power level by the power offset for each service (step 33). The processor calculates an estimated SIR for each service by dividing the expected maximum power by the interference level of the received beacon signal (step 34). The processor calculates a service availability indicator by dividing the estimated SIR with the target SIR for each service (step 35). Then, the processor preferably compares the service availability indicator with a pre-determined threshold for each service (step 36). If the service availability indicator is greater than the threshold for a particular service, the processor generates an output indicating that the particular service is available (step 37). If the service availability indicator is not greater than the threshold, the processor generates an output indicating that the particular service is not available (step 38). Steps 36-38 are performed for each service that may potentially be available to a user as specified by the received beacon signal. This process 30 enables a user to determine which services are and are not available by simply looking at the display of the WTRU without attempting to actually establish a connection for any of the potentially available services. Although a single processor is described herein, any number of processors may be used.

It is noted that the present invention may be implemented in any type of wireless communication system. Further, although the features and elements of the present invention are described in the preferred embodiments in particular combinations, each feature or element can be used alone without the other features and elements of the preferred embodiments or in various combinations with or without other features and elements of the present invention.

What is claimed is:

1. A method implemented in a wireless transmit/receive unit (WTRU) for providing service availability information, comprising:
    receiving a signal transmitted from a base station, said signal identifying a plurality of potentially available services;
    measuring a power level and interference level of the received signal;
    deriving an estimate of a power level of each potentially available service based on the power level of the received signal and predetermined power offsets associated with each potentially available service, wherein the power offset associated with each potentially available service is a ratio of the highest power the base station may dedicate to each potentially available service over the power at which the base station transmits its beacon;
    calculating an estimate of a signal-to-interference ratio (SIR) for each potentially available service from the estimate of a power level of each service and the measured interference level;
    calculating a service availability indicator for each potentially available service by dividing the estimated SIR with a target SIR; and
    outputting service availability indicators for each potentially available service.

2. The method of claim 1 further comprising the step of multiplying the power level of the received signal with the predetermined power offsets to estimate a power level of each service.

3. The method of claim 1 further comprising the step of estimating the estimated SIR at a symbol level.

4. The method of claim 1 further comprising the step of receiving the signal on a beacon channel.

5. The method of claim 1 further comprising the steps of comparing the service availability indicator with a predetermined threshold for each service and providing a service indicator indicating whether or not each potentially available service is available.

6. The method of claim 1 further comprising the step of displaying the service availability indicator on a screen of the WTRU.

7. The method of claim 6 further comprising the step of displaying the service availability indicator with a colored graphical representation.

8. The method of claim 1 further comprising predetermining a list of potentially available services and storing said list in memory of the WTRU.

9. A wireless transmit/receive unit (WTRU) configured to receive a plurality of services, comprising:
    a measuring unit configured to measure a power level of a signal received from a base station;
    a memory configured to store a predetermined target signal-to-interference ratio (SIR) and a predetermined power offset for each service, wherein the power offset for each service is a ratio of the highest power the base station may dedicate to each service over the power at which the base station transmits its beacon; and
    a processor configured to calculate an estimate of a power level for each service and an estimated SIR for each service, and output a service availability indicator for each service, wherein the service availability indicator for each service is obtained by dividing the estimated SIR of each service by its respective target SIR.

10. The WTRU of claim 9 wherein the estimate of a power level for each service is estimated by multiplying the power level of the received signal with the predetermined power offset for each service.

11. The WTRU of claim 9 wherein the processor is further configured to calculate an estimate of an SIR on a symbol level.

12. The WTRU of claim 9 wherein the signal is received on a beacon channel.

13. The WTRU of claim 9 wherein the service availability indicator is further compared with a predetermined threshold for each service, whereby only a service having an indicator greater than the threshold is output as available, and a service having an indicator not greater than the threshold is output as non-available.

14. The WTRU of claim 9 further comprising a display configured to display the service availability indicator.

15. The WTRU of claim 14 wherein the service availability indicator is displayed by a colored graphical representation.

* * * * *